United States Patent
Piret

[15] 3,703,107
[45] Nov. 21, 1972

[54] AUTOMOTIVE TRANSVERSE-MOUNTED POWER UNITS

[72] Inventor: Jean Piret, Billancourt, France

[73] Assignees: Regie National des Usines Renault, Billancourt; Automobiles Peugeot, Paris, both of France

[22] Filed: Jan. 22, 1971

[21] Appl. No.: 108,729

[30] Foreign Application Priority Data

Jan. 26, 1970    France....................7002586

[52] U.S. Cl. ........................74/695, 74/701, 74/606
[51] Int. Cl. .........................F16h 37/08, F16h 57/02
[58] Field of Search................................74/695, 701

[56] References Cited

UNITED STATES PATENTS

| | | | |
|---|---|---|---|
| 2,751,798 | 6/1956 | Keese et al............... | 74/701 X |
| 2,913,927 | 11/1959 | Issigonis..................... | 74/701 |
| 3,017,787 | 1/1962 | Payne......................... | 74/701 |
| 3,312,060 | 4/1967 | Gabriel..................... | 74/695 X |
| 3,473,412 | 10/1969 | Bookout..................... | 74/695 |

*Primary Examiner*—Arthur T. McKeon
*Attorney*—Stevens, Davis, Miller & Mosher

[57] ABSTRACT

A power unit mounted across the longitudinal axis of a motor vehicle comprises a torque converter casing, a main transmission mechanism and differential gear casing connected to the power unit along orthogonal assembling planes and centered to one another by means of a cylindrical fitting. A detachable casing section assembled on the one hand to the main casing of the transmission mechanism along an assembling plane perpendicular to the assembling plane of the power unit crankcase and on the other hand to the torque converter casing is provided.

8 Claims, 3 Drawing Figures

AUTOMOTIVE TRANSVERSE-MOUNTED POWER UNITS

The present invention relates in general to the arrangement of power and transmission units disposed transversely in relation to the longitudinal median axis of a motor vehicle and has specific reference to an arrangement of a power and transmission mechanism of the type in which a given ratio between the rotational velocity of an internal combustion engine and the road wheels of an automotive vehicle can be obtained automatically, this mechanism being designated hereinafter under the general term of automatic change-speed transmission.

As a rule, in known mechanisms of this character the following main elements are found:

- the hydrokinetic torque converter providing the coupling between the output end of the engine crankshaft and the input shaft of the change-speed transmission;
- the input shaft of the change-speed transmission;
- the output shaft of the change-speed transmission;
- the epicyclic gear train mechanism providing a series of ratios between the velocities of the input and output shafts of the transmission mechanism, respectively;
- the hydraulic-controlled system of coupling members providing the engagement of, and maintaining, a selected or given gear ratio;
- an electro-hydraulic distributing unit controlling the hydraulic couplings, which is responsive to orders received from hydro-pneumatic members measuring the engine torque and servo-action electrical and electronic elements;
- these electrical and electronic servo-action elements designed for converting into electrical control signals the resultant of the comparison between the relative speed of the vehicle measured from the output shaft of the change-speed transmission mechanism, and the orders issued by the driver which are detected by the position of the throttle valve;
- the hydraulic pump supplying fluid to the various mechanism and requiring for its operation a fluid under a regulated pressure;
- the differential gear connecting the rotational movements of the output shaft of the transmission mechanism to the shafts driving the propelling wheels of the vehicle;
- the device for measuring the relative speed of the vehicle.

A specific design of such automatic change-speed transmissions appears in the mounting thereof on motor vehicles having a transverse-mounted power unit wherein the axes of rotation of the crankshaft, of the gear box shafts and of the drive wheel shafts are substantially parallel and perpendicular to the longitudinal axis of the vehicle. This specific arrangement, advantageous on account of its considerable compactness, is attended on the other hand by difficult problems arising from the necessity of combining more or less compatible properties such as great sturdiness, light weight and simplicity in the manufacture and assembling of the complete mechanism.

The solutions usually resorted to in this field do not meet completely these requirements as a rule and consist mainly of compromises in which one more desirable properties are sacrificed to the benefit of other properties.

In fact, in many known designs it is observed that the manual gear box is enclosed in a two-section casing having a joint plane parallel to or disposed along the axes of the input and output shafts of the mechanism. This type of gear casing require an assembling gasket of relatively large surface area which must apply to a strictly flat surface obtained through a very accurate machining operation. Furthermore, assembling the two casing halves or sections involves the use of additional sturdy assembling members near the bearings in order to absorb the reactions of the driving pinion of the differential.

It is the essential object of the present invention to provide an improved design of the casing of the change-speed mechanism whereby a joint plane having a reduced surface area can be used.

Another object of this invention is to facilitate the access and assembling of certain component elements of the transmission mechanism through the use of interfitting casing sections of elements.

A complementary object of the present invention consists in providing an arrangement of the cavities for receiving the oil for lubricating the elements of the change-speed mechanism and of the engine with a view to improving the transmission efficiency.

The power unit according to this invention, disposed transversely to the longitudinal axis of the motor vehicle and comprising a casing for the torque converter, a main casing for the change-speed transmission mechanism and the differential mechanism, which is made of detachable elements, connected to the engine unit along orthogonal assembling planes, an epicyclic gear change-speed mechanism comprising friction-coupling members, at least one input shaft and one output shaft disposed coaxially to each other, a device for measuring the relative speed of the vehicle which is coupled to the output shaft, is characterized in that the torque converter casing and the casing enclosing the friction coupling members of the change-speed mechanism, connected in a manner already known per se along two orthogonal assembling or joint planes, are mutually centered by means of a cylindrical fitting surface, and that the casing enclosing said friction coupling members comprises at least one detachable casing element assembled on the one hand to the main casing of the transmission mechanism which carries the speed measuring device along an assembling plane perpendicular to the assembling plane of the engine unit, and on the other hand to the torque converter casing.

Under these conditions it is clear that the orthogonal or perpendicular assembling planes of the proposed arrangement have a minimum surface area and are no more the seat of stresses tending to separate the casing elements, comparable to the stresses exerted on the bearings of the transmission casing. Thus, the large-diameter bolts provided in the hitherto known designs for reacting to the bearing buttressing efforts produced in conventional designs can be dispensed with.

The automatic change-speed transmission mechanism for automotive vehicle having a transverse-mounted power unit thus obtained permits combining the desirable properties of sturdiness, light-weight and simplicity of manufacture and assembling of the mechanism as a whole, while preserving the advantageous feature of considerable compactness.

Other features, objects and advantages of this invention will appear as the following description proceeds with reference to the attached drawings. Of course, various changes may be brought to details concerning the construction, design and arrangement of the component elements of which a preferred form of embodiment is illustrated by way of example, without however departing from the spirit and scope of the invention as set forth in the appended claims.

Figure 1:
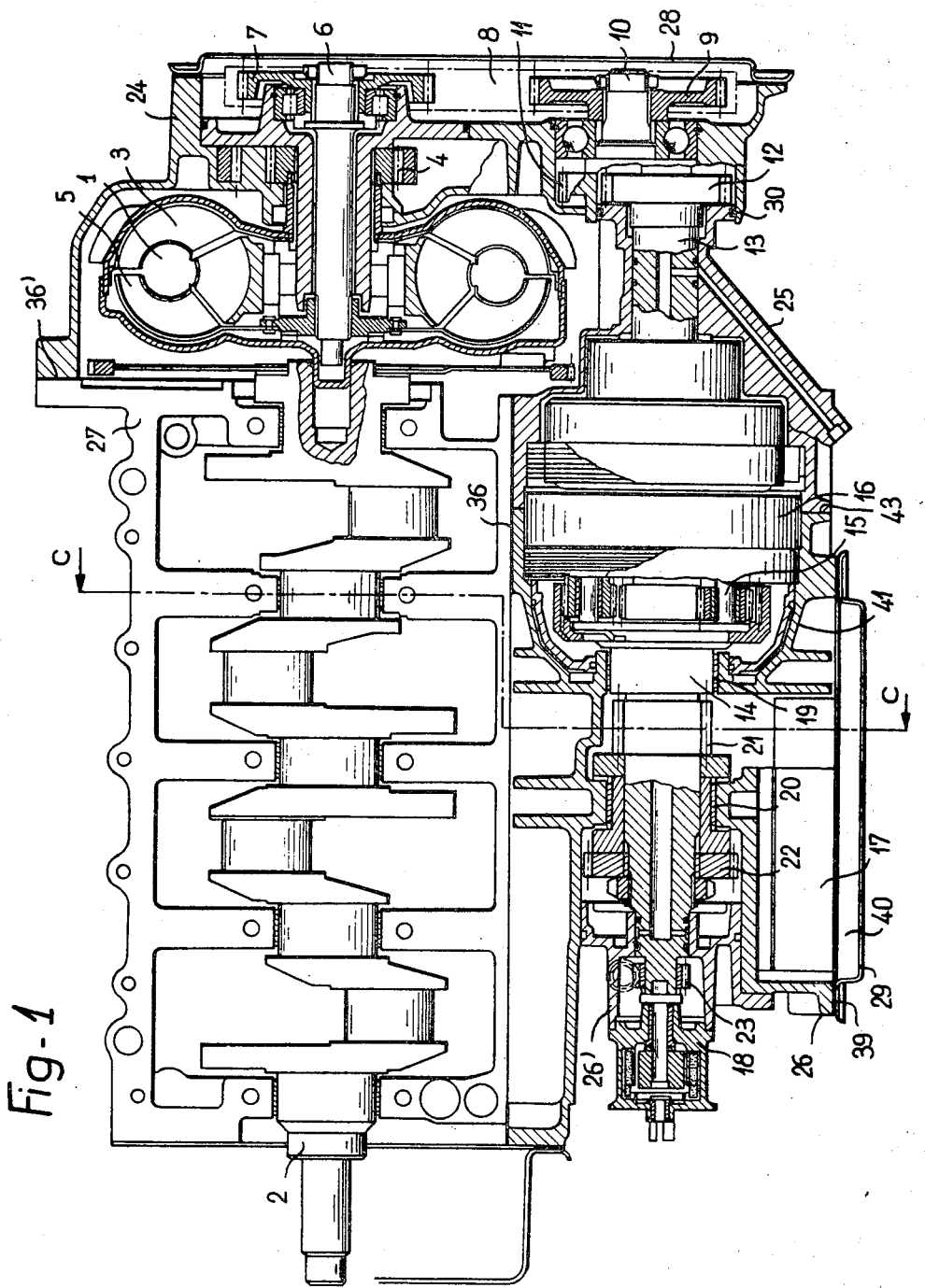
FIG. 1 is an elevational view of a longitudinal section of the power unit, the section being taken along the line A—A of FIG. 3.

It will be noted that in the figures only those portions of the power unit and transmission mechanism that are necessary for a proper understanding of the invention are designated by reference numerals.

Referring first to FIG. 1, the hydro-kinetic torque converter 1 is mounted to the output end of the engine crankshaft 2. The input member or pump 3 of the converter is rotatably solid with the crankshaft and of the gear pump 4, the output member or turbine 5 being rigid with a shaft 6 provided with a pinion 7.

A driving member 8 meshes with pinion 7 and another pinion 9 rigid with the shaft 10 and also with pinion 11. This pinion 11 is in meshing engagement with a pinion 12 rigid with the input shaft 13 of the change-speed transmission mechanism. This shaft 13 is connected to the output shaft 14 of the mechanism through one or a plurality of epicyclic trains 15 responsive to a set of friction coupling members 16.

These friction coupling members 16 are controlled by hydraulic signals delivered from the electro-hydraulic distributing unit shown diagrammatically at 17. This electro-hydraulic distributing unit 17 utilizes electric signals generated in an electronic unit 31 (FIG. 2) mounted on the speed measuring device 18, and also the hydraulic signals generated by a hydro-pneumatic detector (not shown). The electronic unit and the hydropneumatic detector are no part of the present invention and therefore not described in detail herein. Useful reference may be made in this respect to the U.S. Pat. Nos. 3,495,469 of Feb. 17, 1970 and 3,505,909 of Apr. 14, 1970.

The relative speed of the vehicle is measured by a tachometric alternator 18 mounted directly to the end of the output shaft 14 of the change-speed mechanism, without any reduction or bevel gearing.

The input shaft 13 and output shaft 14 of the change-speed transmission mechanism are supported by plain bearings such as 19, 20 between which the driving pinion 21 of the differential is disposed, as shown in FIG. 1.

Beyond the bearing 20 is a toothed wheel 22 having the function of locking the shaft 14 for holding the vehicle in the parking position. Between the wheel 22 and alternator 18 is another pinion 23 adapted to transmit the motion to the speedometer on the instrument panel of the vehicle.

All these mechanisms are mounted in a casing assembly 24, 25, 26 rigidly connected to one another and to the engine crankcase or block 27. These casings comprise fluid-tight closing plates such as 28, 29 or covers 34, 35.

The casings 24 and 25 are also centered to each other by means of a cylindrical fitting 30.

FIG. 1 shows how the stator of the tachometric alternator 18 is rigid with a cap 26' fitted in the casing 26 enclosing the epicyclic trains of gears and also the manner in which the rotor of this alternator is coupled to the free end of the output shaft 14 of the change-speed transmission mechanism.

Figure 3:
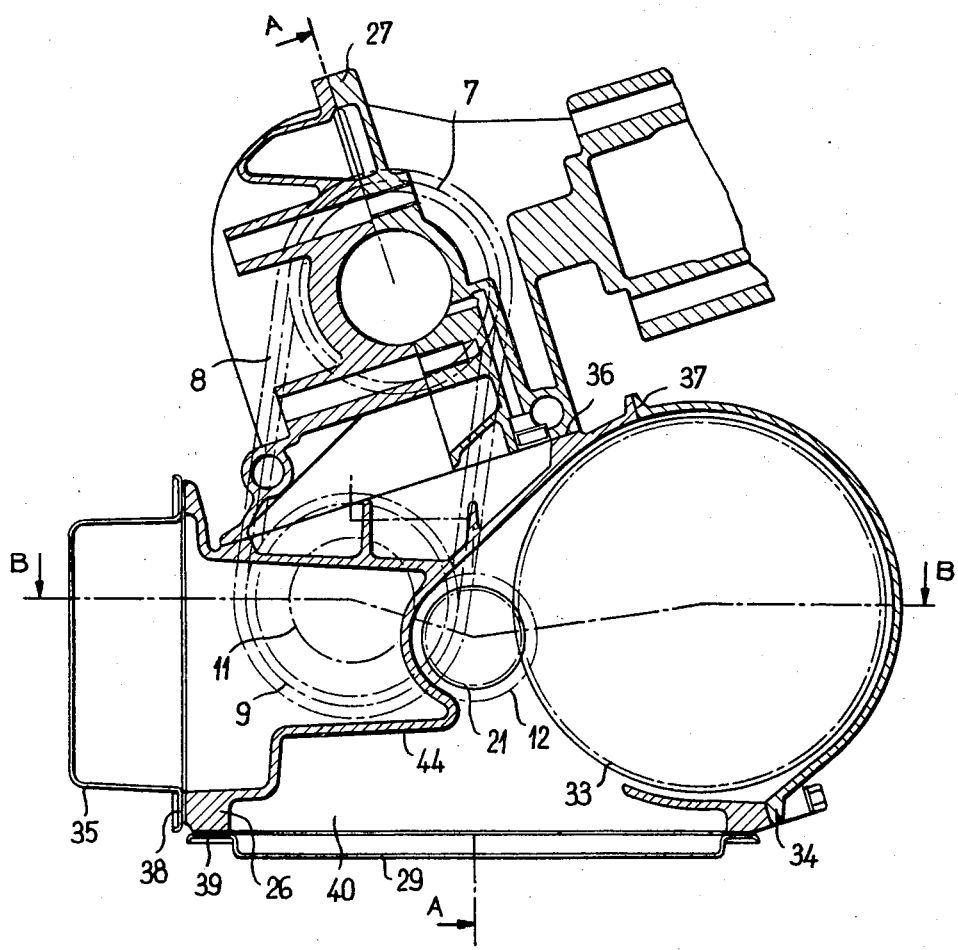
FIG. 3 is a cross sectional view of the power unit, taken along the line C—C of FIG. 1.

The casing 26 enclosing likewise the differential mechanism 32 comprises a cover 34. The plane 37 along which the cover 34 is assembled to this casing 26 may advantageously extend at right angles to the assembling plane 36 of the engine cylinder crankcase or block (FIG. 3).

Another cover 35 of casing 26 forms in conjunction with an inner partition 44 cast in said casing the sump in which the engine lubricating oil is kept.

To facilitate the machining of this casing 26 the assembling or joint planes 38 and 39 of cover 35 and closing plate 29 are also perpendicular. Thus, it will be seen that the automatic change-speed mechanism has a particular design adapted to be used in a motor vehicle having a transverse-mounted power unit whenever it is desired to combine a considerable compactness with properties such as sturdiness, minimum weight and simplified manufacture and assembling.

The closing plate 29 of main casing 26 which lies at the lower portion of the power unit and transmission assembly defines a capacity 40 constituting the cavity for retaining the oil necessary for lubricating and operating the change-speed mechanism proper.

This casing 26 comprises an integral partition 41 disposed between the main cavity 40 and the chamber 42 surrounding the friction coupling members 16. The aforesaid partition 41 will thus prevent the splashing (generated by the oil inertia during strong accelerations of the vehicle) of these friction members, thus reducing accordingly the slippage of clutch disks or brakes incorporated in the transmission, as this slippage would be detrimental to the efficiency of operation of the transmission.

FIGS. 1 and 3 illustrate more clearly the arrangement of the various assembling planes or joint planes of casing 24 (enclosing the torque converter 1) and casing 25 (enclosing the friction coupling members 16). The other casings 24, 25 are connected to the engine crankcase 27 by means of perpendicular joint planes 36, 36'.

Figure 2:
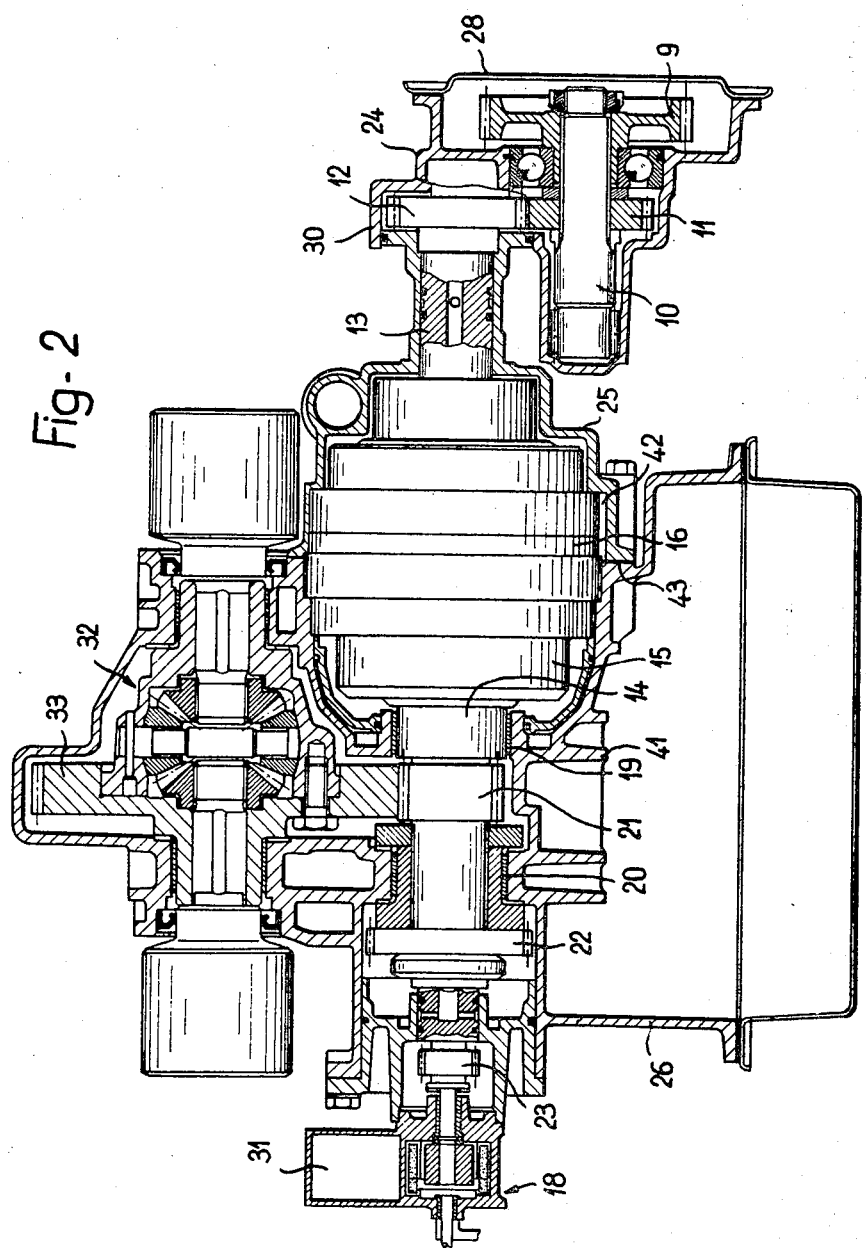
FIG. 2 is a view from above of a longitudinal section taken along the line B—B of FIG. 3.

FIG. 2 shows on the other hand the position of the electronic unit 31 mounted on the tachometric alternator 18 as well as the differential mechanism 32 of which the crown wheel 33 is in constant meshing engagement with its driving pinion 21.

FIGS. 1 and 2 show how the casing 25 is connected on the one hand to the main casing 26 along an assembling or joint plane 43 perpendicular to the joint plane 36 of the engine crankcase, and on the other hand to the converter casing 24 by means of the aforesaid cylindrical fitting 30.

What is claimed as new is:

1. A power and transmission unit for a motor vehicle adapted for disposition in a direction transverse to the longitudinal axis of a motor vehicle, comprising:

an engine crankcase;

a change-speed transmission mechanism comprising epicyclic trains of gears and friction coupling members and at least one input shaft and one output shaft disposed coaxially to each other;

a differential mechanism;

a device for measuring the relative speed of a vehicle, said device connected to the output shaft of said change-speed mechanism;

a hydrokinetic torque converter;

a main casing enclosing a portion of said change-speed mechanism and said differential mechanism;

a second casing enclosing said hydrokinetic torque converter, each of said casings comprising a detachable section connected to the engine crankcase along a joint plane;

a third casing enclosing the friction coupling members of the change speed mechanism, said third casing comprising at least one detachable casing section connected to said main casing along a joint plane which is perpendicular to the major axis of the crankcase, and connected to said second casing and the joint plane between the second casing and the crankcase is perpendicular to the joint plane between the third casing and said crankcase, and said second and third casings are aligned with each other by means of cylindrical fitting surfaces on each of said casings.

2. Enclosures for the power and transmission units of a motor vehicle, comprising:
  a. an engine crankcase;
  b. a main casing for enclosing a portion of a change-speed transmission mechanism, and for enclosing a differential mechanism;
  c. a second casing for enclosing a hydrokinetic torque converter, each of said casings comprising a detachable section connected to said crankcase along a joint plane;
  d. a third casing for enclosing a further portion of a change-speed mechanism, said third casing comprising at least one detachable casing section connected to said main casing along a joint plane which is perpendicular to the major axis of the crankcase, and connected to said second casing; and the joint plant between the second casing and the crankcase is perpendicular to the joint plane between the third casing and said crankcase; and said second and third casings are aligned with each other by means of cylindrical fitting surfaces on each of said casings.

3. Power and transmission unit according to claim 1, characterized in that the speed measuring device comprises a tachometric alternator having its stator rigid with the third casing enclosing the epicyclic trains of gears and its rotor coupled to the free end of the output shaft of said change-speed transmission mechanism.

4. Power and transmission unit according to claim 1, characterized in that the input shaft of said change-speed transmission mechanism is driven from said torque converter through a shaft carrying two pinions meshing the one with the member driving said torque converter and the other with a pinion rigid with the input shaft of the change-speed transmission mechanism.

5. Power and transmission unit according to claim 4, characterized in that said input shaft and output shaft of the change-speed transmission mechanism are carried by plain bearings.

6. Power and transmission unit according to claim 1, characterized in that the main casing of said change-speed mechanism comprises a cover forming with an internal partition cast integrally with said casing a cavity constituting the engine lubricating oil sump.

7. Power and transmission unit claim 1, characterized in that the main casing enclosing the differential is provided with a cover of which the joint plane is perpendicular to the joint plane of the engine crankcase with the change-speed main casing.

8. Power and transmission unit according to claim 1, characterized in that the main casing comprises at least one closing member forming with an internal partition of said casing a cavity adapted to receive the oil for lubricating the change-speed transmission mechanism, said cavity being separated by said partition from the space enclosing said friction coupling members.

* * * * *